United States Patent
Ananth et al.

(10) Patent No.: US 10,897,303 B1
(45) Date of Patent: Jan. 19, 2021

(54) ANTENNA SYSTEM FOR PROVIDING COVERAGE FROM A HIGH-ALTITUDE PLATFORM

(71) Applicant: Loon LLC, Mountain View, CA (US)

(72) Inventors: Sharath Ananth, Cupertino, CA (US); Cyrus Behroozi, Menlo Park, CA (US); Sergey Vichik, Haifa (IL)

(73) Assignee: LOON LLC, Mountain View, CA (US)

( * ) Notice: Subject to any disclaimer, the term of this patent is extended or adjusted under 35 U.S.C. 154(b) by 0 days.

(21) Appl. No.: 16/674,662

(22) Filed: Nov. 5, 2019

(51) Int. Cl.
| | |
|---|---|
| *H04W 4/00* | (2018.01) |
| *H04B 7/185* | (2006.01) |
| *H01Q 1/28* | (2006.01) |
| *H04W 84/06* | (2009.01) |
| *H01Q 21/20* | (2006.01) |
| *H01Q 25/00* | (2006.01) |
| *H04B 7/06* | (2006.01) |
| *H01Q 3/24* | (2006.01) |

(52) U.S. Cl.
CPC ......... *H04B 7/18504* (2013.01); *H01Q 1/286* (2013.01); *H01Q 3/242* (2013.01); *H01Q 21/205* (2013.01); *H01Q 25/002* (2013.01); *H04B 7/0617* (2013.01); *H04B 7/18506* (2013.01); *H04W 84/06* (2013.01)

(58) Field of Classification Search
CPC ............ H04B 7/18504; H04B 7/18506; H04B 7/0617; H01Q 3/242; H01Q 1/286; H01Q 25/002; H01Q 21/205; H04W 84/06
USPC .......................................... 455/431; 370/338
See application file for complete search history.

(56) References Cited

U.S. PATENT DOCUMENTS

| | | | |
|---|---|---|---|
| 8,983,420 B2 | 3/2015 | Musselman | |
| 9,966,658 B2 | 5/2018 | Fitz-Coy et al. | |
| 10,249,948 B2 | 4/2019 | Feria et al. | |
| 2018/0358683 A1* | 12/2018 | Sarkis | H01Q 1/1271 |
| 2019/0379432 A1* | 12/2019 | Monir Vaghefi | H01Q 1/246 |
| 2020/0119811 A1* | 4/2020 | Kay | H04B 7/18513 |

* cited by examiner

*Primary Examiner* — Marcos Batista
(74) *Attorney, Agent, or Firm* — Botos Churchill IP Law LLP

(57) ABSTRACT

Aspects of the disclosure provide an antenna system for a high-altitude platform (HAP). The antenna system may include a central panel including a first set of antenna elements. The antenna system may also include a plurality of auxiliary panels arranged around the central panel and at an angular offset from the central panel. Each auxiliary panel of the set of auxiliary panels may include a second plurality of antenna elements. The first plurality of antenna elements may be configured to provide network coverage within a first area having a first radius and each of the second sets of antenna elements are configured to provide network coverage within a second area beyond the first radius.

20 Claims, 10 Drawing Sheets

ANTENNA SYSTEM FOR PROVIDING COVERAGE FROM A HIGH-ALTITUDE PLATFORM

BACKGROUND

Information can be transmitted over directional point-to-point networks or point-to-multipoint networks, such as aerospace and other mobile networks. In such networks, links can be formed between pairs of nodes by aiming transceivers of each node pair towards each other. In some implementations, nodes may include non-geostationary satellite orbit (NGSO) satellites or other high-altitude platforms (HAPs) that are in motion relative to the Earth.

BRIEF SUMMARY

The technology described herein provides for an antenna system configured to provide coverage from a high-altitude platform. The antenna system may be configured to provide coverage to a plurality of sectors in a large geographic area from a low earth orbit. One aspect of the disclosure provides a system including an antenna system for a high-altitude platform (HAP). The antenna system includes a central panel including a first set of antenna elements; and a plurality of auxiliary panels arranged around the central panel and at an angular offset from the central panel. Each auxiliary panel of the plurality of auxiliary panels includes a second set of antenna elements. The first set of antenna elements are configured to provide network coverage within a first area having a first radius and each of the second sets of antenna elements are configured to provide network coverage within a second area beyond the first radius.

In one example, the plurality of auxiliary panels includes at least 4 auxiliary panels. In another example, the plurality of auxiliary panels includes at least 12 auxiliary panels. In another example, the central panel is arranged such that when in operation on the HAP, the central panel is oriented or faces in a downward direction relative to the HAP. In this example, the plurality of auxiliary panels are arranged such that when in operation on the HAP, the plurality of auxiliary panels are oriented at an angle offset from the downward direction relative to the HAP corresponding to a downward tilt. In addition, the downward tilt is a fixed orientation. Alternatively, the downward tilt is an adjustable orientation. In another example, the plurality of auxiliary panels are arranged such that when in operation on the HAP, the central panel is recessed relative to the auxiliary panels. In another example, the central panel includes a planar surface on which the first set of antenna elements are arranged. In another example, the central panel is a ring. In another example, the first set of antenna elements are arranged at regular intervals around the central panel. In another example, each of the plurality of auxiliary panels. In another example, each of the second sets of antenna elements are arranged in a linear array on a respective one of the plurality of auxiliary panels. In another example, each of the second sets of antenna elements has a clover-shape. In another example, each of the plurality of auxiliary panels has a same configuration. In another example, the system also includes one or more processors configured to electronically steer a pointing direction of a beam formed by the first set of antenna elements. In another example, the system also includes a gimbal configured to adjust an orientation of the central panel relative to the HAP and thereby steer a pointing direction of a beam formed by the first set of antenna elements. In another example, the plurality of auxiliary panels are arranged such that when in operation on the HAP, the central panel is arranged below the auxiliary panels. In another example, the system also includes the HAP. In this example, the HAP includes a balloon.

DETAILED DESCRIPTION

Overview

Figure 1:
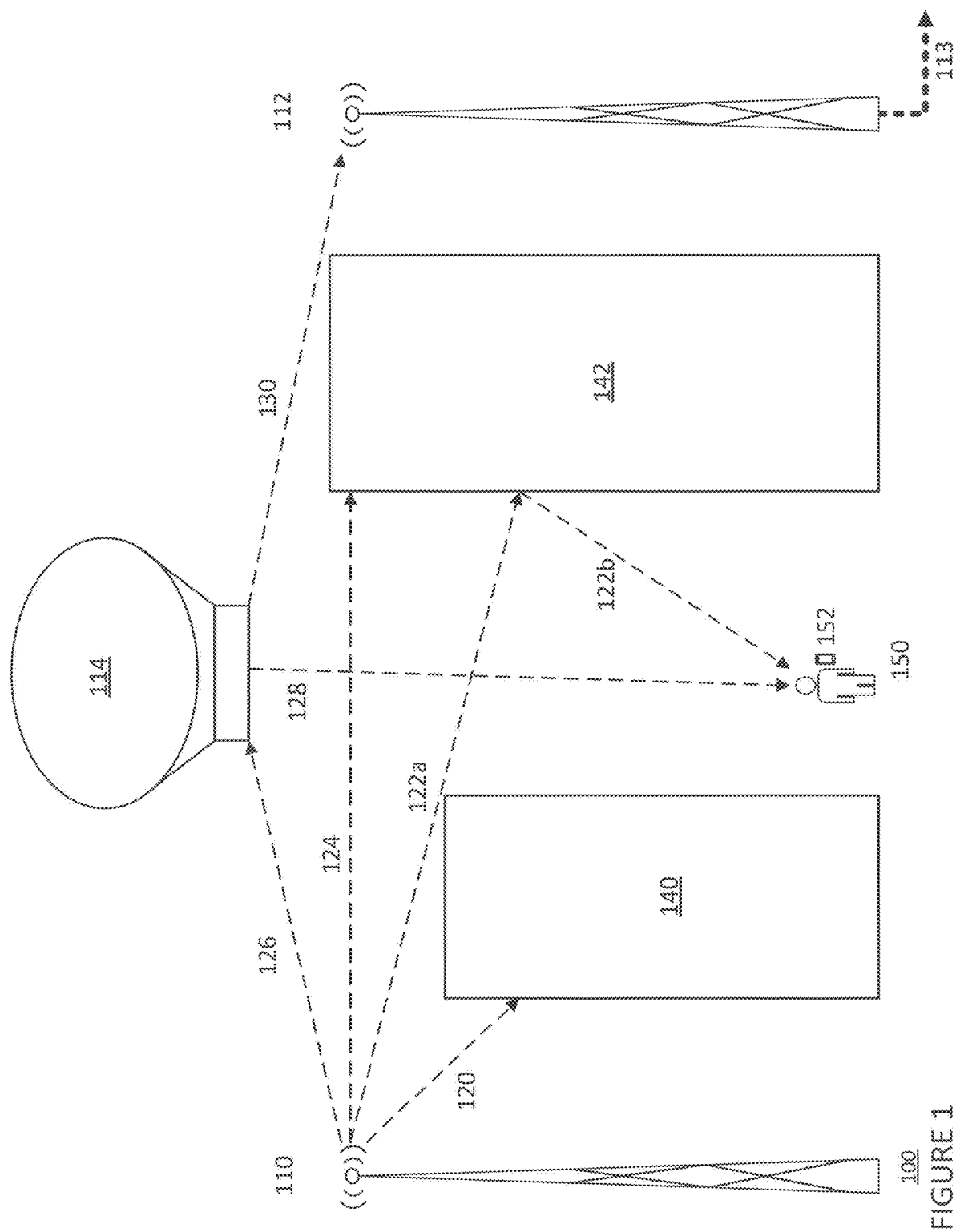
FIG. 1 is a pictorial diagram of a portion of an example network in accordance with aspects of the disclosure.

The technology relates to a communication system on a high-altitude platform (HAP) for providing coverage over a large geographic area. The large geographic area may have a first radius on the order of tens of kilometers. To provide coverage over the large geographic area, the communication system may include an antenna system designed to point a plurality of spot beams radially about the HAP at a downward angle relative to the HAP. The antenna system may also be configured to point at least one spot beam directly downward relative to the HAP. The spot beams may be independently or collectively steerable. The steering of the spot beams may be performed mechanically and/or electronically. Using this antenna system, the communication system may be able to provide coverage to the entirety of the large geographic area in an efficient manner.

The antenna system for the communication system of the HAP may include a plurality of antenna elements in a split arrangement. The split arrangement may comprise a central panel and at least one auxiliary panel. The central panel includes a set, or an array, of antenna elements and is installed facing downward relative to the HAP. The set of antenna elements may be arranged in a planar array on the central panel, and the central panel may be normal to a downward direction relative to the HAP. Each auxiliary panel includes another set of antenna elements and is installed about the central panel with a downward tilt relative to the HAP. The downward tilt may be a mechanical tilt or an electronic tilt.

In this split arrangement, the antenna system may provide coverage in a first sector directly below the HAP using the set of antenna elements on the central panel. The first sector may have a second radius smaller than the first radius of the large geographic area. For a plurality of auxiliary elements, the set of antenna elements on each auxiliary element may be used in the antenna system to provide coverage to a sector covering a portion of the area between the first radius and the second radius.

In some implementations, the set of antenna elements on the at least one auxiliary panel may also be steered to narrow or widen the area of coverage provided by the at least one auxiliary panel. The width of the area of coverage may also be determined based on population density, history of demand, presence of other terminals (terrestrial towers, other HAPs, etc.) providing coverage in or near the area, or other network factors. Additionally or alternatively, the central panel may be steerable. In another alternative, a separate steerable antenna may be mounted on the HAP in addition to or in place of the central panel. The separate steerable antenna may be configured to provide narrow, high capacity coverage to a smaller geographic area within the large geographic area.

The features described herein may provide for a communication system that, when mounted on a HAP, increases coverage and capacity for a network. The antenna system may reach areas tens of kilometers in radius with more consistent, low capacity coverage and may also be used for narrower, high capacity coverage for particular areas with a need for greater bandwidth. As described, the communication system may flexibly adapt to different network needs for a geographic area and may conserve resources as a result.

Example Network

FIG. 1 is a pictorial diagram of an example system 100 of network nodes in a network. The network may include nodes mounted on various land-based and air-based devices, some of which may change position with respect to other nodes in the network over time. For example, as shown in FIG. 1, the network includes as nodes a first terrestrial tower 110 and a second terrestrial tower 112. The network also includes as a node a high-altitude platform 114. As shown, HAP 114 is a balloon. In other embodiments, the HAP may be a blimp, an airplane, an unmanned aerial vehicle (UAV) such as a drone, a satellite, or another platform capable of low Earth orbit. The network nodes as shown in FIG. 1 are illustrative only, and the network may include additional or different nodes. For example, in some implementations, the network may include additional HAPs and/or additional terrestrial towers. When the network includes at least one low Earth orbit or high Earth orbit satellite as well as one other type of HAP, the network may be defined as a hybrid HAP/satellite network.

Nodes in the network may be equipped to transmit and receive mmWave signals or other very high frequency signals. Additionally or alternatively, nodes in the network may be equipped to transmit and receive other radio-frequency signals, optical signals, or other communication signal capable of travelling through free space. In this regard, the system may include any number of possible paths for a transmitted communication signal to pass through the network.

The dashed-line arrows of FIG. 1 shown projecting from nodes represent possible paths 120, 122a, 122b, 124, 126, 128, 130 for a transmitted communication signal. As shown in FIG. 1, some possible paths may be blocked by buildings, such as buildings 140, 142. For example, a signal following path 120 from node 110 may be angled below the horizon and be blocked by building 140. A signal following path 122a from node 110 may be angled above path 120, avoiding building 140, but then may contact building 142. The signal following path 122a may reflect off building 142 and follow path 122b towards the ground location of a user 150, carrying a client device 152. A signal following path 124 from node 110 may be angled towards or above the horizon, nearly parallel to the ground, passing over building 140, but then may be blocked by building 142. A signal following path 126 from node 110 may be angled above the horizon and reach node 114. A signal following path 128 from node 114 directed to the ground location of user 150. A signal following path 130 from node 114 may be angled below the horizon, pass over building 142, and reach node 112.

In addition, a signal transmitted from the client device 152 of the user 150 back towards one or more nodes of the network. For example, a signal from the client device 152 may be transmitted back along paths 122b and 122a towards node 110. Another signal from the client device 152 may be transmitted back along path 128 towards node 114. In addition, multiple users or multiple client devices may form bi-directional access links with a given node of the network at a given point in time, in addition to the user 150 and the client device 152 shown in FIG. 1.

In some implementations, the network may serve as an access network for client devices such as cellular phones, laptop computers, desktop computers, wearable devices, or tablet computers. For example, nodes 110, 112, 114 may connect to the datacenters via wireless, fiber, or cable backbone network links or transit networks operated by third parties. The nodes 110, 112, 114 may provide wireless access for users, such as user 150, and may forward user requests to the datacenters and return responses to the users via the backbone network links.

As an example, the first terrestrial tower 110, the second terrestrial tower 112, and the HAP 114 may include wireless transceivers configured to operate in a cellular or other mobile network, such as 5G NR (new radio) networks or LTE networks. The nodes 110, 112, 114 may operate as gNodeB stations, eNodeB stations, or other wireless access points, such as WiMAX or UMTS access points. One or more terrestrial towers in the network may include an optical fiber or other link connecting the one or more terrestrial towers to another terrestrial tower or datacenter. For example, the second terrestrial tower 112 may include fiber 113, shown by a dashed-line arrow, that connects to another terrestrial tower (not shown). In addition, the user 150 may be carrying a client device 152 which may be configured to communicate with one or more of the nodes in the network. The network also may be connected to a larger network, such as the Internet or other public or private networks, and may be configured to provide a client device with access to resources stored on or provided through the larger network.

In some implementations, the network can be a software-defined network (SDN) that is controlled by an SDN network controller. The SND network controller may be located at one of the network nodes or at a separate platform, such as, for example, in a datacenter. The nodes of the network, including nodes 110, 112, 114 may be configured to communicate with one another using steerable transceivers. As the HAPs in the network, such as HAP 114, move with respect to other nodes in the network, such as terrestrial towers 110, 112, some network links may become infeasible due to range of the transceivers or obstacles between the nodes. Thus, the configuration of the network may require regular (i.e., periodic) or irregular reconfiguration using the network controller to maintain connectivity and to satisfy determined network flows.

Example Systems

Figure 2:
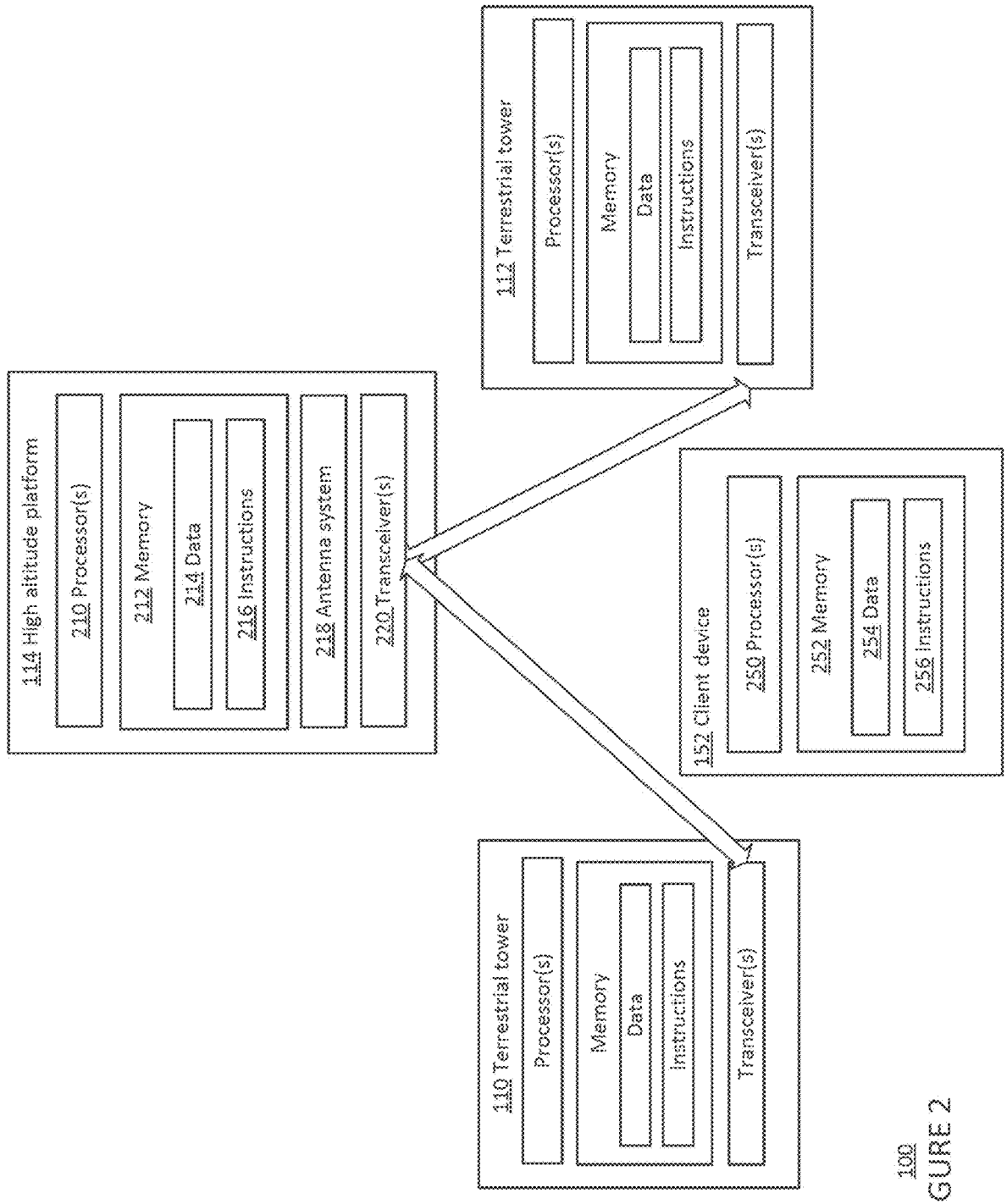
FIG. 2 is a functional diagram of nodes of the network shown in FIG. 1 in accordance with aspects of the disclosure.

As shown in FIG. 2, each node, such as first terrestrial tower 110, second terrestrial tower 112, and HAP 114, may include one or more transceivers configured to transmit and receive communication signals and create one or more communication links with another node in the network. Referring to HAP 114 as an example, each of the nodes, may include one or more processors 210, memory 212, an antenna system 218, and one or more transceivers 220. In this regard, the processors, memory, antenna system, and transceivers of first terrestrial tower 110 and second terrestrial tower 112 may be configured the same as or similarly to those of the HAP 114. While only terrestrial towers 110, 112 and HAP 114 are shown, other terrestrial towers and HAPs in the network may have the same or as similar configurations.

The one or more processors 210 may be any conventional processors, such as commercially available CPUs. Alternatively, the one or more processors may be a dedicated device such as an application specific integrated circuit (ASIC) or other hardware-based processor, such as a field programmable gate array (FPGA). The one or more processors 210 may be configured to operate according to a given protocol architecture for a mobile network, such as 5G NR architecture or LTE radio protocol architecture. Although FIG. 2 functionally illustrates the one or more processors 210 and memory 212 as being within the same block, it will be understood that the one or more processors 210 and memory 212 may actually comprise multiple processors and memories that may or may not be stored within the same physical housing. Accordingly, references to a processor or computer will be understood to include references to a collection of processors or computers or memories that may or may not operate in parallel.

Memory 212 may store information accessible by the one or more processors 210, including data 214, and instructions 216, that may be executed by the one or more processors 210. The memory may be of any type capable of storing information accessible by the processor, including non-transitory and tangible computer-readable mediums containing computer readable instructions such as a hard-drive, memory card, ROM, RAM, DVD or other optical disks, as well as other write-capable and read-only memories. The system and method may include different combinations of the foregoing, whereby different portions of the data 214 and instructions 216 are stored on different types of media. In the memory of each node, such as memory 212 of HAP 110a, a forwarding information base or forwarding table may be stored that indicate how signals received at each node should be forwarded, or transmitted. For example, the forwarding table stored in memory 212 may indicate that a signal received from ground station 107a should be forwarded to HAP 110d.

Data 214 may be retrieved, stored or modified by the one or more processors 210 in accordance with the instructions 216. For instance, although the system and method are not limited by any particular data structure, the data 214 may be stored in computer registers, in a relational database as a table having a plurality of different fields and records, XML documents or flat files. The data 214 may also be formatted in any computer-readable format such as, but not limited to, binary values or Unicode. By further way of example only, image data may be stored as bitmaps comprised of grids of pixels that are stored in accordance with formats that are compressed or uncompressed, lossless (e.g., BMP) or lossy (e.g., JPEG), and bitmap or vector-based (e.g., SVG), as well as computer instructions for drawing graphics. The data 214 may comprise any information sufficient to identify the relevant information, such as numbers, descriptive text, proprietary codes, references to data stored in other areas of the same memory or different memories (including other network locations) or information that is used by a function to calculate the relevant data.

The instructions 216 may be any set of instructions to be executed directly (such as machine code) or indirectly (such as scripts) by the one or more processors 210. For example, the instructions 216 may include the given protocol architecture for the mobile network of which the node is a part. The given protocol architecture may include a split architecture between a central unit and a distributed unit. In addition, the given protocol architecture may define a control plane, a user plane, or other protocol layers. The given protocol architecture may also include an interface that defines a plurality of messages for use in communication between the protocol layers. The instructions 216 may be stored as computer code on the computer-readable medium. In that regard, the terms "instructions" and "programs" may be used interchangeably herein. The instructions 216 may be stored in object code format for direct processing by the one or more processors 210, or in any other computer language including scripts or collections of independent source code modules that are interpreted on demand or compiled in advance. Functions, methods and routines of the instructions 216 are explained in more detail below.

The one or more transceivers 220 may include at least one wireless transceiver mounted to actuators that can be controlled, or steered, to point in a desired direction. To form a wireless link between two nodes, such as the node associated with the HAP 114 and the node associated with the first terrestrial tower 110, the wireless transceivers of the respective nodes can be controlled to point in the direction of one another so that data can be sent and received between the nodes. For nodes with fiber or cable connections, such as second terrestrial tower 112, the one or more transceivers 220 may also include at least one transceiver configured to communicate via a fiber or cable connection.

As further shown in FIG. 2, the client device 152 associated with user 150 may be a personal computing device or a server with one or more processors 250, memory 252, data 254, and instructions 256 similar to those described above with respect to the one or more processors 210, memory 212, data 214, and instructions 216. As an example, a personal computing devices may include a personal computer that has all of the components normally used in connection with a personal computer such as a central processing unit (CPU), memory (e.g., RAM and internal hard drives) storing data and instructions, an electronic display (e.g., a monitor having a screen, a small LCD touch-screen, a projector, a television, or any other electrical device that is operable to display information), user input (e.g., a mouse, keyboard, touch screen or microphone), camera, speakers, a network interface device, and all of the components used for connecting these elements to one another. Personal computing devices may also include mobile devices such as PDAs, cellular phones, and the like. Indeed, client device 152 may be any device capable of processing instructions and transmitting data to and from humans and other computers including general purpose computers, network computers lacking local storage capability, and set top boxes for televisions. In some embodiments, client devices may be associated with one or more SDN applications and may have one or more northbound interface (NBI) drivers.

Figure 3A:
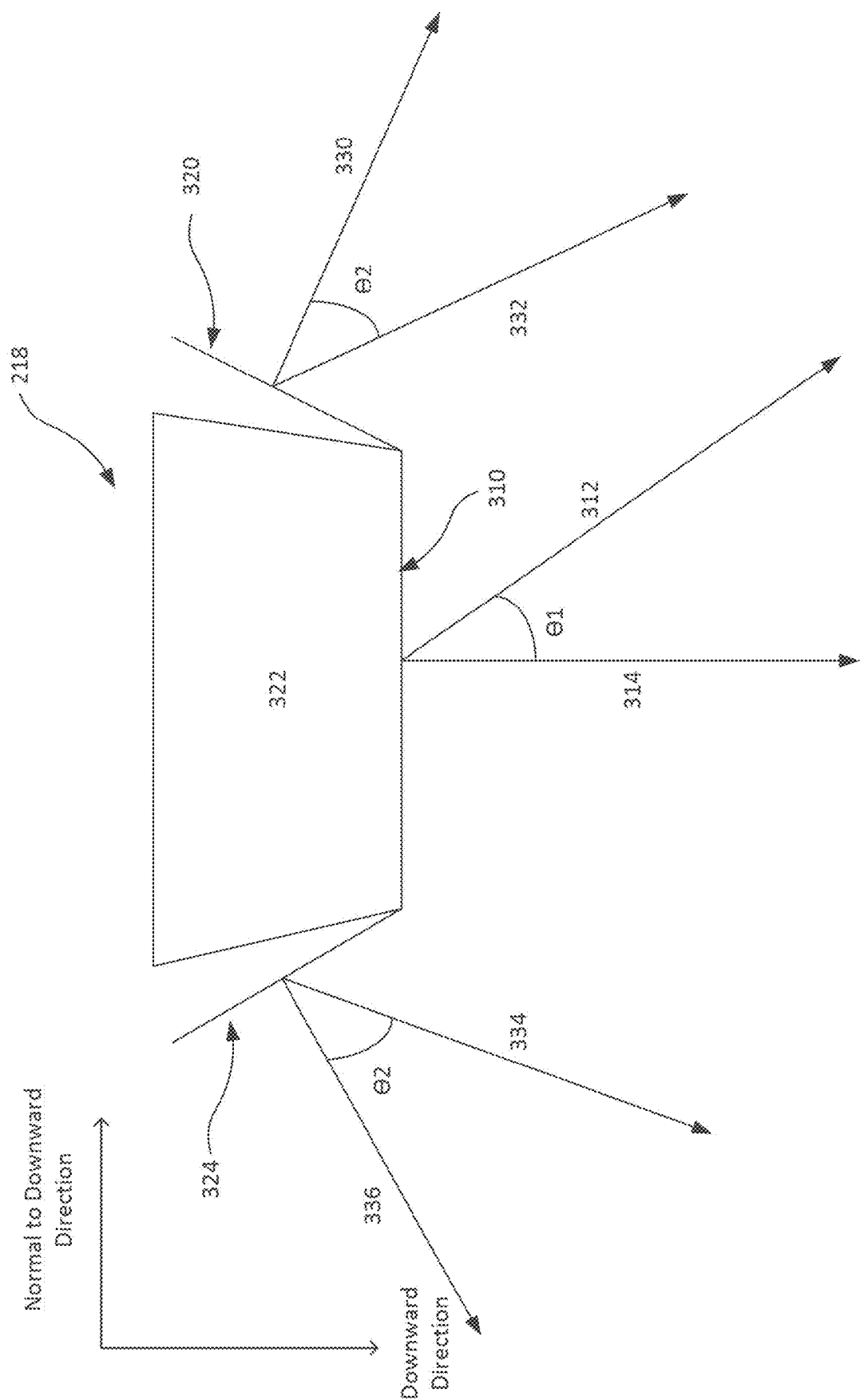
FIGS. 3A and 3B are an example configuration of an antenna system in accordance with aspects of the disclosure.
Figure 3B:
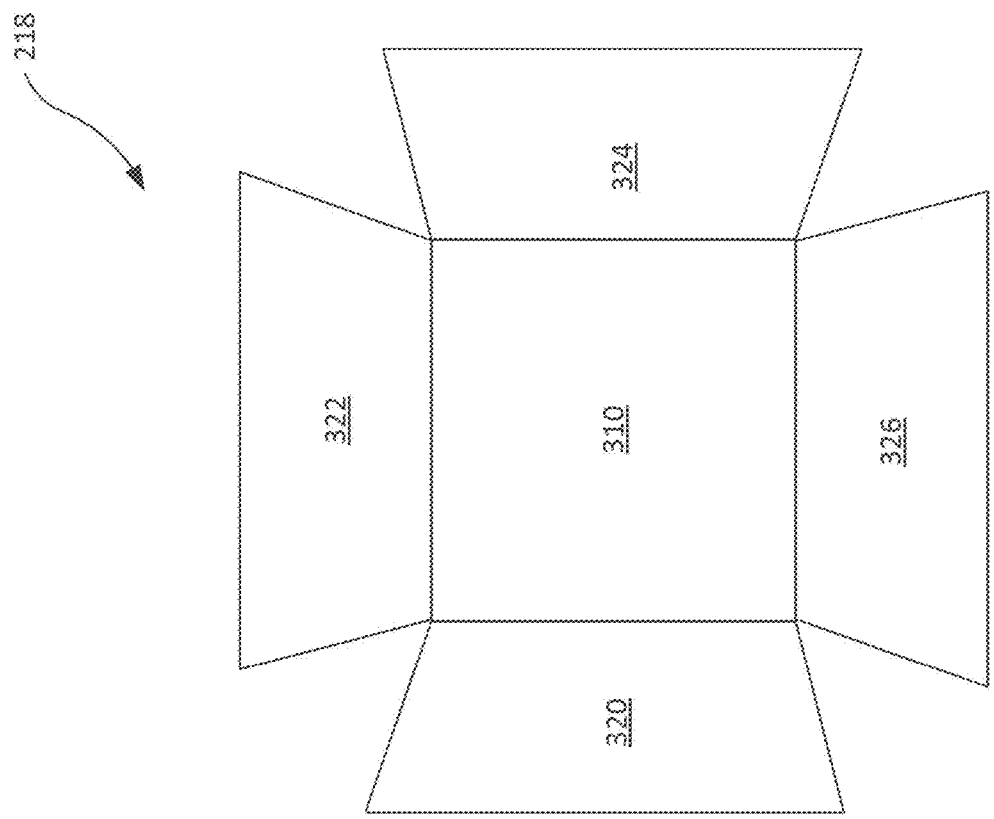
Figure 4:
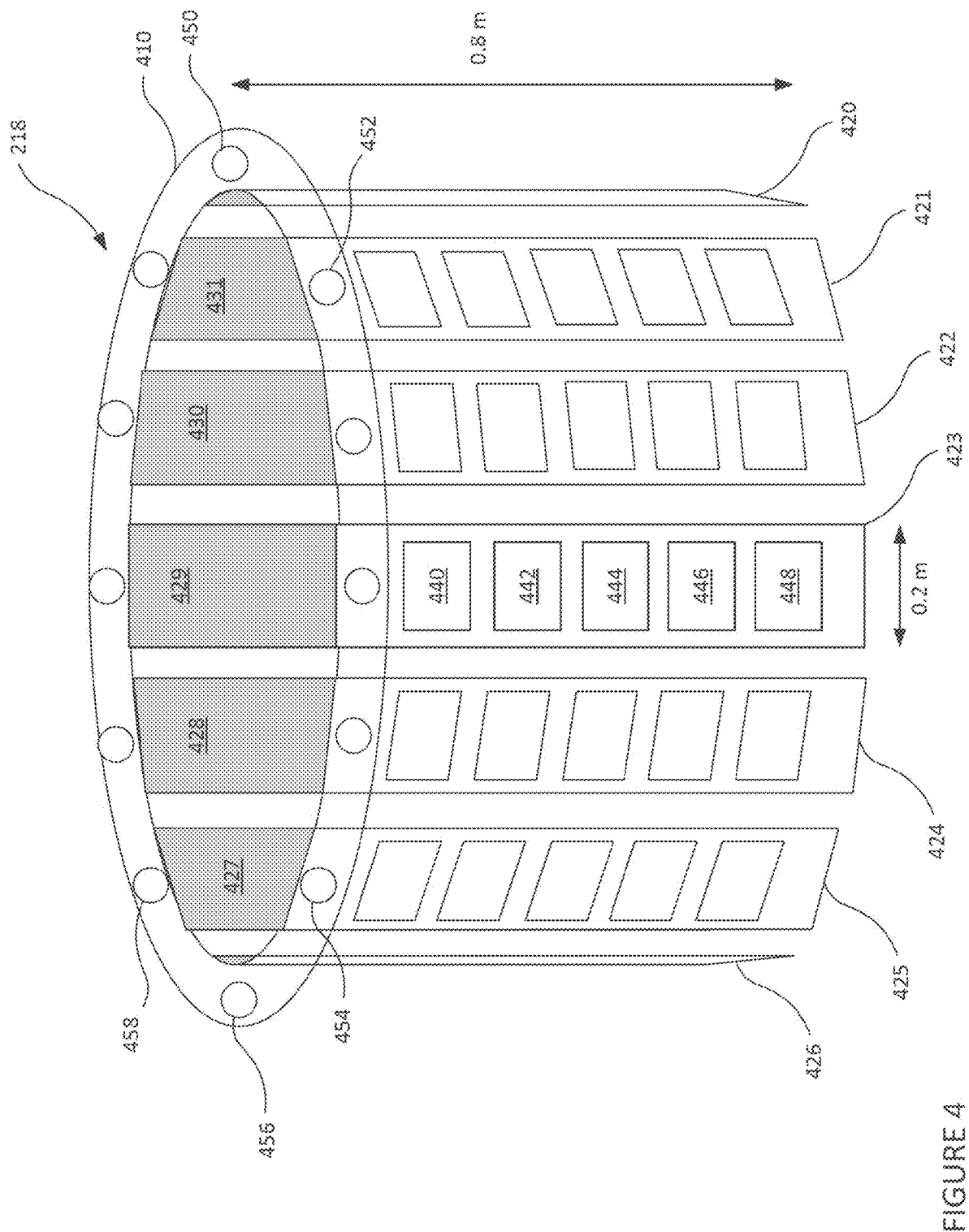
FIG. 4 is an example configuration of an antenna system in accordance with aspects of the disclosure.
Figure 5:
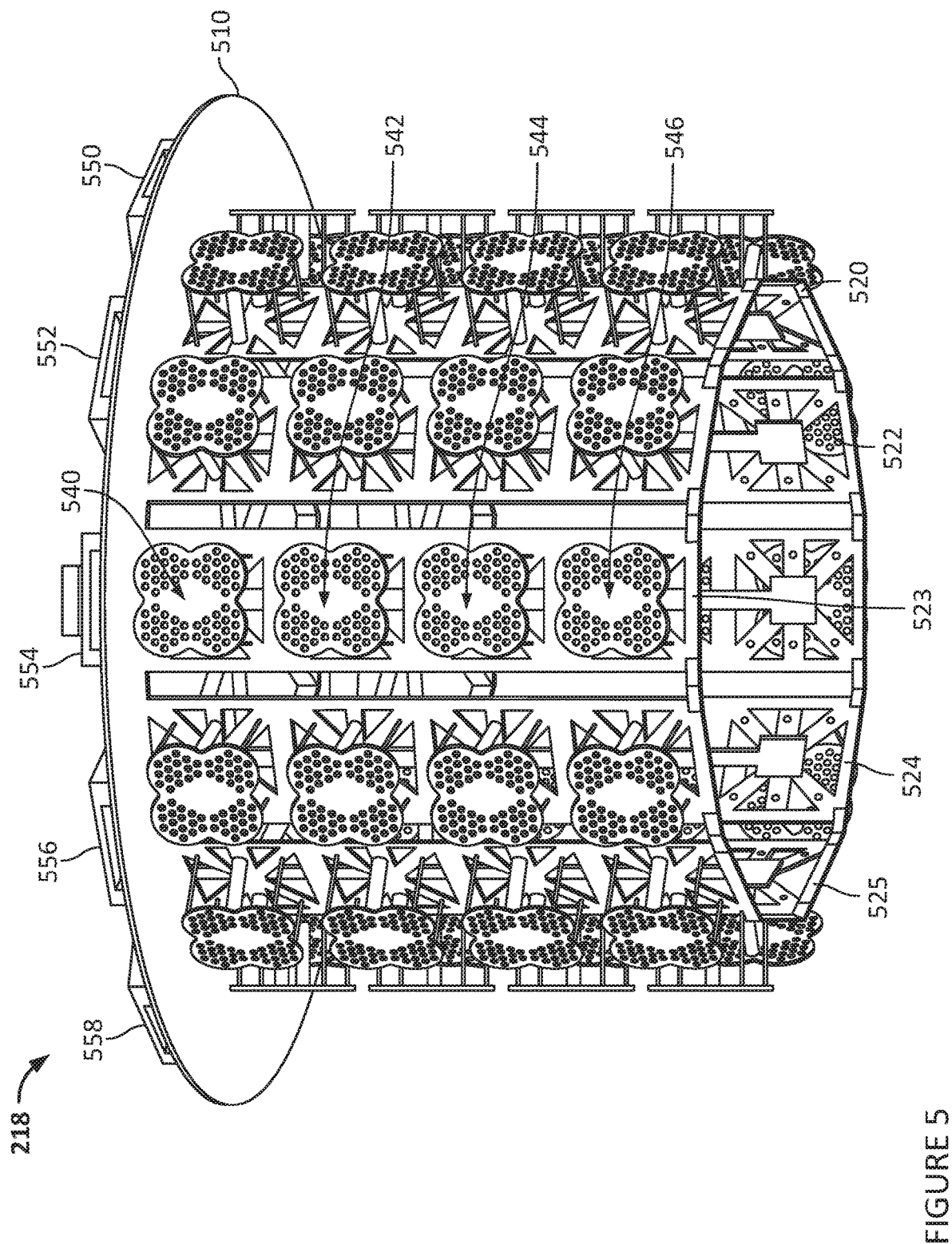
FIG. 5 is an example configuration of an antenna system in accordance with aspects of the disclosure.

The antenna system 218 of the HAP 114 may include a plurality of antenna elements in a split arrangement. For instance, the antenna system 218 may include a central panel and at least one or a plurality of auxiliary panels arranged at an angle offset from the central panel. Turning to FIG. 3A, which provides a partial representative view of an example configuration of the antenna system 218, includes a central panel 310 and four auxiliary panels 320, 322, 324, 326 (only 3 are visible in the view of FIG. 3A) at an angle offset from the central panel 310 and a downward direction (toward the ground) relative to the HAP 114. For instance, turning to FIG. 3B, which provides a bottom-up view of the antenna system 218, four auxiliary panels 320, 322, 324, 326 are arranged around a central panel 310. Although this example depicts more auxiliary panels, more, such as 8 or 12 (as shown in FIGS. 4 and 5), or less, such as 2 or 1, auxiliary panels may be used.

The central panel may include a set, or an array, of antenna elements. The central panel may be installed on the HAP 114 such that when in operation, the central panel is oriented or faces in a downward direction relative to the HAP 114. The set of antenna elements may be arranged in a planar array on the central panel, and when in operation, the central panel may be oriented in a plane that is normal to the downward direction relative to the HAP 114. In this regard, the set of antenna elements may be configured to point at least one spot beam in the downward direction relative to the HAP 114. The spot beams may be independently or collectively steerable as discussed further below. For example, in a situation in which an HAP is proximate to a particular city, beams may be pointed towards the city in order to provide coverage to the city or away from the city in order to prevent interference to terrestrial towers in the city. This decision can be made independently on different directions of the HAP, depending on city locations around the HAP.

Each auxiliary panel includes another set of antenna elements and is installed about the central panel with a downward tilt relative to the HAP 114. The downward tilt may be structural (e.g. a fixed orientation) or alternatively, an electronic tilt (e.g. an adjustable orientation) as discussed further below. In this regard, the set of antenna elements of the auxiliary panels may each be configured to point at least one spot beam at an angle that is offset from the at least one spot beam of the set of antenna elements of the central panel or not directly downward relative to the HAP 114.

The sets of antenna elements of each auxiliary panel and/or the central panel may have various configurations. For instance each panel may have 3, 4, 5 or more sets of antenna elements.

The central panel may have any number of different configurations. The central panel may be mounted below the at least one auxiliary panel as depicted in FIGS. 3A and 3B or may be recessed relative to the auxiliary panels. The central panel 310 may include a planar surface holding the set of antenna elements. For instance, the central panel may include a rectangular, circular, or another planar shape having a center point. In another example configuration of the antenna system 218, depicted in FIG. 4, a central panel 410, which may include various of the features of central panel 310 described above, may be a planar ring mounted above at least one auxiliary panel. In this example, there are 12 auxiliary panels 420-431, each including a set of antenna element 440, 442, 444, 446, 448 (only those of auxiliary panel 423 being called out for simplicity). In addition, antenna elements 450, 452, 454, 456, 458 (only a few being called out for simplicity) of the central panel 410 may be arranged at regular intervals around the planar ring, pointing directly downward relative to the HAP 114.

The at least one auxiliary panel may comprise a single cylindrical, conical, parabolic a planar, rectangular panel with antenna elements arranged about the panel, or may comprise a plurality of auxiliary panels that each hold a separate set of antenna elements. In addition, when a plurality of auxiliary panels are used, such as in the examples of FIGS. 3A, 3B, and 4, the auxiliary panels may all have the configuration, for instance, same dimensions and hold a same arrangement of antenna elements. In some instances, the antenna elements may be arranged on a rectangular auxiliary panel in a linear array along the length of the auxiliary panel. For example, there may be five antenna elements arranged along each auxiliary panel as shown in the example of FIG. 4. Alternatively, each auxiliary panel may have 3 or 4 or more antenna elements.

In some examples, each antenna element on the auxiliary panel may be clover-shaped. In another example configuration of the antenna system 218, depicted in FIG. 5, a central panel 510, which may include various of the features of central panels 310 and/or 410 described above, may be a planar ring, a rectangular array of antenna elements, or a circular array of antenna elements mounted above at least one auxiliary panel. In this example, there may be 12 auxiliary panels 520, 522, 523, 524, 525, though only 5 are visible in the view of FIG. 5. In this example, each auxiliary panel include four antenna element 540, 542, 544, 546 (only those of auxiliary panel 523 being called out for simplicity). Again, antenna elements 550, 552, 554, 556, 558 (only a view being visible in the view of FIG. 5) of the central panel 510 may be arranged at regular intervals around the planar ring, pointing directly downward relative to the HAP 114.

As an alternative configuration to the example of FIGS. 3A, 3B, 4 and 5, different numbers of auxiliary panels may be used. For instance, instead of 4 or 12 auxiliary panels with 5 elements each, 6 auxiliary panels may be used. As compared to the examples of FIGS. 4 and 5, this would change the digital beam forming coefficients and would also change the antenna gain, but would still be functional for the uses described herein. Again, as noted above, any number of auxiliary panels may be used.

The auxiliary panels may be installed at regular intervals about an axis perpendicular to and centered on the central panel. For example, when there are four auxiliary panels (such as in the examples of FIGS. 3A and 3B), the first auxiliary panel may point in a first direction, the second auxiliary panel may point in a second direction rotated 90 degrees about the axis from the first direction, the third auxiliary panel may point in a third direction rotated 90 degrees about the axis from the second direction, and the fourth auxiliary panel may point in a fourth direction rotated 90 degrees about the axis from the third direction. When there are twelve auxiliary panels (such as in the examples of FIGS. 4 and 5), each panel may be rotated about the axis by 30 degrees relative to a neighboring panel.

The auxiliary panels may be oriented perpendicular to the central panel and may be configured to point downward relative to the HAP using electronic steering. For instance, standard digital or analog beamforming techniques can be used to achieve beam steering. Digital beam forming may require an RF path for each element, whereas analog beam forming can be done by using analog phase shifters. Other analog beamforming methods will use butler matrices. Yet another analog beam forming approach having different combining circuits may be used. Alternatively, reflector antennas with multiple feeds may be used. In this example, different feed architectures may be used such that the antenna elements themselves can be steered. For example, one or more processors may be configured to perform beam forming for the set of 5 antenna elements on a given auxiliary panel to form a beam pointing at approximately 60 degrees toward the horizon. Alternatively, the auxiliary panels may be mounted to be angled away from the central panel (such as in the example of FIGS. 3A and 3B), such that the antenna elements on the auxiliary panels are tilted downward relative to the HAP.

Figure 6:
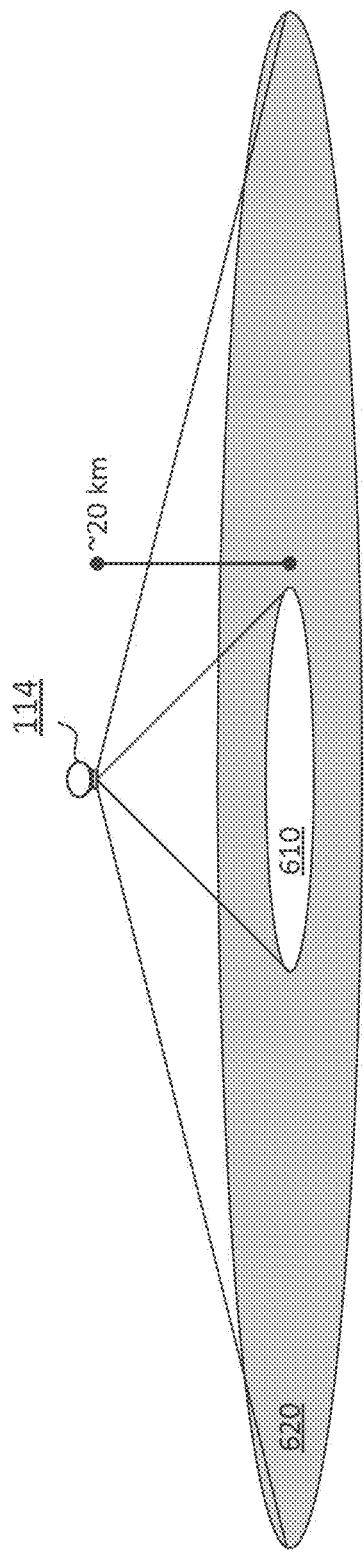
FIG. 6 is an example representation of a coverage area in accordance with aspects of the disclosure.

As shown in FIG. 6, in the split arrangement, the antenna system 218 (using any of the examples of FIG. 3A, 3B, 4 or 5) may provide coverage in a first sector 610 directly below the HAP 114 using the set of antenna elements on the central panel. The first sector 610 may have a second radius smaller than a first radius of a large geographic area 620. The set of antenna elements on the central panel 310 may be configured to form a beam having a beam width of approximately plus or minus 50 degrees (i.e. 100 degrees in total) about a center of the central panel or an axis corresponding to the direction of gravity as depicted by arrows 312, 314 and angle θ1 in the example of FIG. 3A. Angles of greater than 50 degrees may also be possible; however, this may lead to large side lobes and large directivity loss. Returning to FIG. 6, the first radius of the large geographic area may be approximately 80 kilometers. As an example, when the HAP 114 is flying at approximately 20 kilometers above the large geographic area 620, the second radius of the first sector may be approximately 20 kilometers. In addition or alternatively, the first sector may be subdivided into a plurality of sectors formed by the central panel as discussed with respect to FIGS. 7 and 8 below. These sectors may each be within plus or minus 50 degrees of elevation relative to a center of the central panel or an axis corresponding to the direction of gravity.

The set of antenna elements on the at least one auxiliary panel may be used in the antenna system to provide coverage to one or more sectors in the area between the first radius and the second radius, represented by the shading in FIG. 6. Each auxiliary panel 320, 322 may be tilted mechanically or electronically to point towards the area between the first radius and the second radius. In addition, the set of antenna elements on the at least one auxiliary panel may be configured to form a beam having a smaller elevational coverage that the set on the central panel. For example, the elevational coverage may be approximately 32 degrees from where the first sector ends, as depicted by arrows 330, 332, 334, 336 and angles θ2 in the example of FIG. 3A. In other words, the sector corresponding to 0 to 50 degrees may be covered by the central panel, while the sector corresponding to 45 degrees to 77 degrees may be covered by the antenna elements of each auxiliary panel. In this regard, there may be some overlap in the sectors between 45 and 50 degrees. The total coverage provided by this example antenna system may therefore be 0 degrees to 77 degrees relative to a center of the central panel or an axis corresponding to the direction of gravity toward the horizon. Therefore, when the HAP 114 is flown at 20 approximately kilometers, 77 degrees of elevational coverage may reach approximately 86.6 kilometers. The reduction in elevational coverage may provide greater gain at greater elevations than if the elevational coverage of the one or more auxiliary panels were the same as that of the central panel. In some cases, there may be overlap between the coverage of the central panel and the coverage of the at least one auxiliary panel, which may decrease the total elevational coverage of the antenna system.

Figure 7:
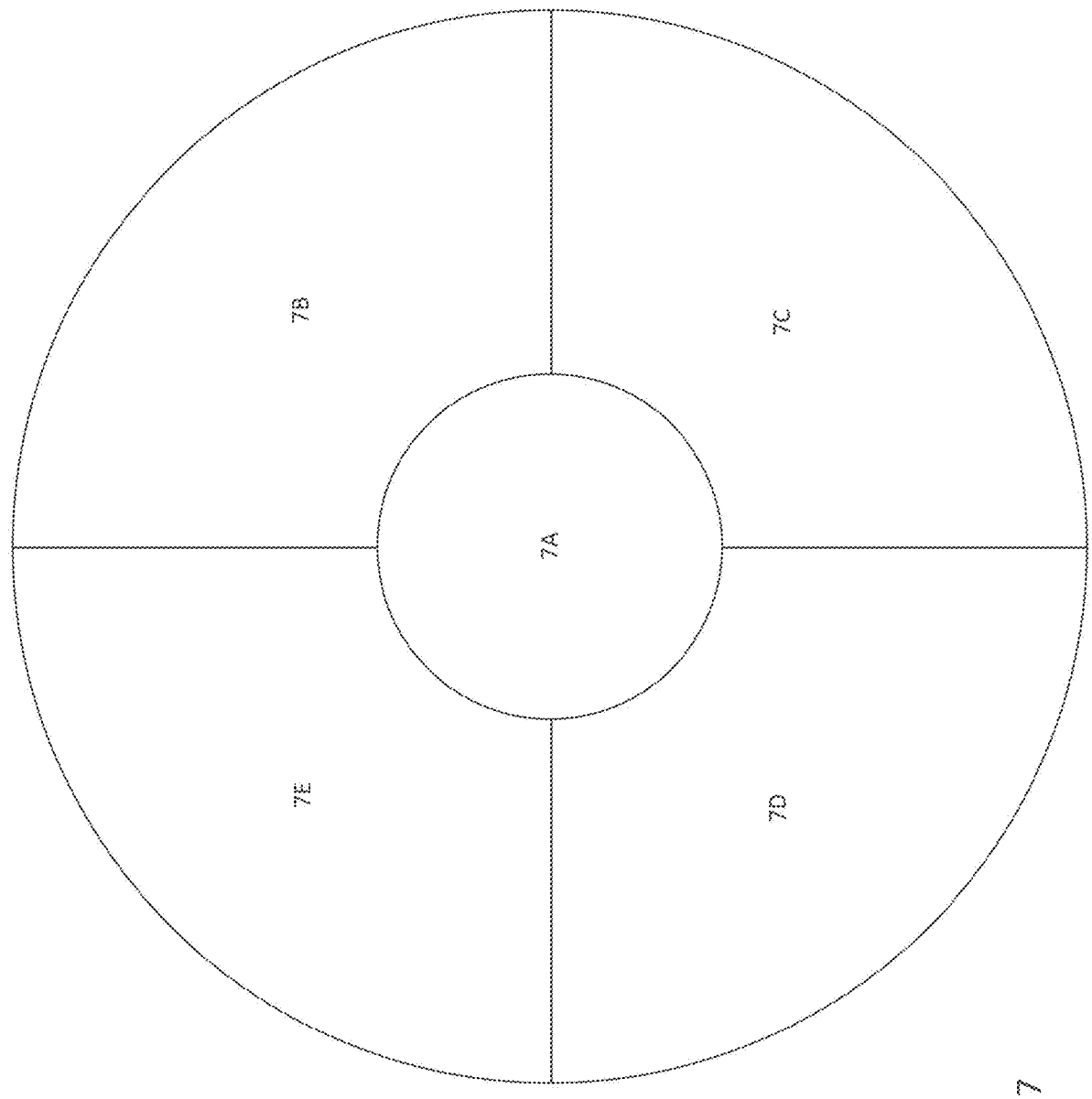
FIG. 7 is an example coverage area configuration in accordance with aspects of the disclosure.
Figure 8:
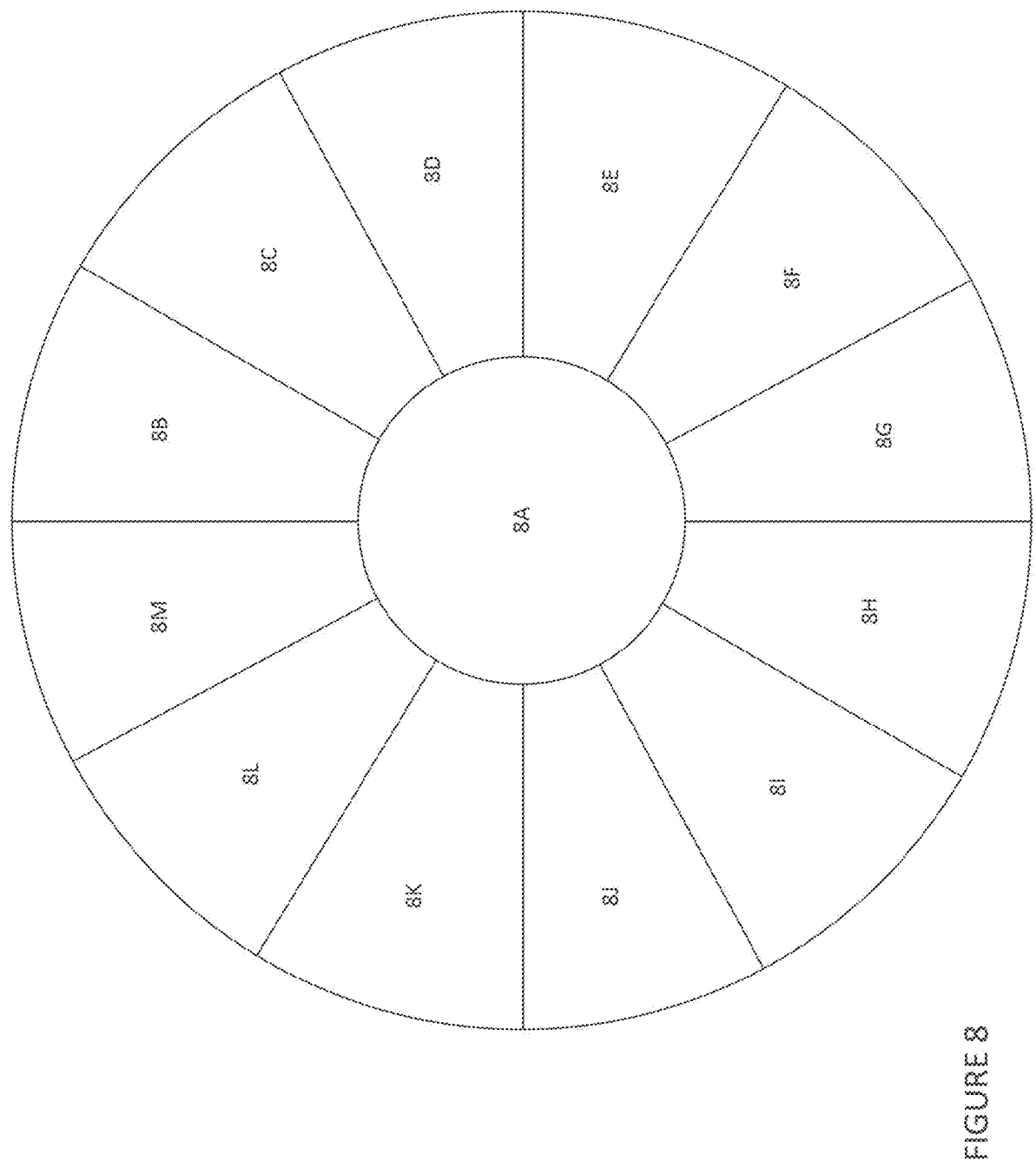
FIG. 8 is an example coverage area configuration in accordance with aspects of the disclosure.

For a plurality of auxiliary panels, the set of antenna elements on each auxiliary panel may be used in the antenna system to provide coverage to a sector covering a portion of the area between the first radius and the second radius. The portion of the area may include an arclength of the area. The arclength of the area covered by each auxiliary panel may be equal in size. FIGS. 7 and 8 are representative examples coverage area configurations for the antenna system 218. Referring to FIG. 7 which may correspond to the example of FIGS. 3A and 3B, when there are four auxiliary panels arranged around a central panel, the antenna elements (represented by sector 7A) of the central panel may cover an area of the first radius. In addition, the sets of antenna elements on each auxiliary panel may cover at least approximately 90 degrees arclength (represented by sector 7B-7D) of the area between the first radius and the second radius. Referring to FIG. 8 which may correspond to the example of FIG. 4 or 5, when there are twelve auxiliary panels arranged around a central panel, the antenna elements (represented by sector 8A) of the central panel may cover an area of the first radius. In addition, the sets of antenna elements on each auxiliary panel may cover at least approximately 30 degrees arclength (represented by sectors 8B-8M) of the area between the first and the second radius. The coverage provided by a given auxiliary panel may be adjacent to or slightly overlapping the coverage provided by a neighboring auxiliary panel.

Figure 9:
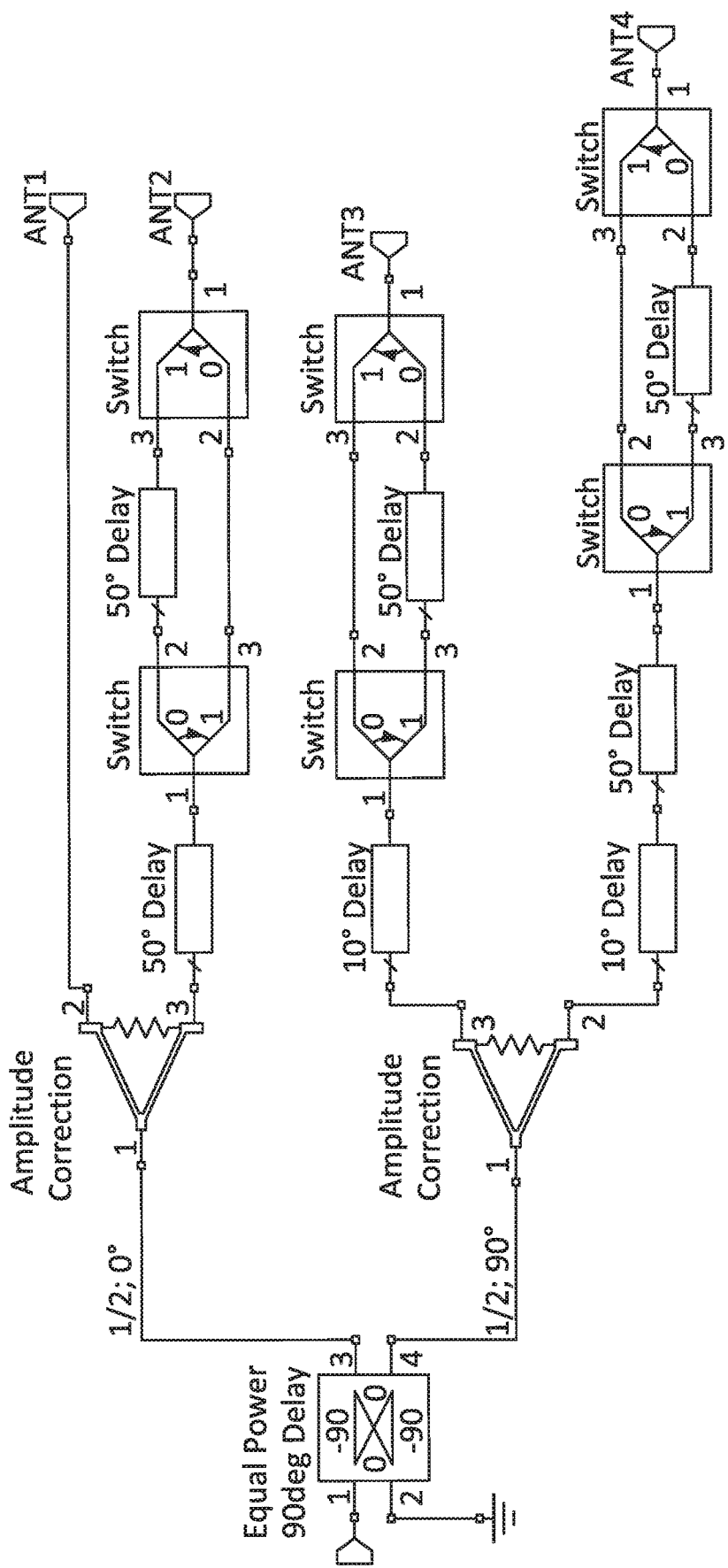
FIG. 9 is an example switching system in accordance with aspects of the disclosure.

The coverage area of a given auxiliary panel may be adjustable independent from the central panel and any other auxiliary panels. The coverage for individual sectors may therefore be adjusted independent from other sectors. For instance, as noted above, the tilt of the at least one auxiliary panel relative to the central panel may be an electronic tilt. For example, an angle of a tilt of the given auxiliary panel may be adjusted mechanically by one or more processors of the HAP, such as the one or more processors 210 of HAP 114 using a switching system, such as that which is depicted in FIG. 9. In this example, various switches may be used to switch between two adjustable tilts for a set of antenna arrays for an auxiliary panel including 4 antenna elements, ANT1-ANT4. The angle of the tilt may be adjustable between 15 degrees and 35 degrees below the horizon, between 105 degrees and 125 degrees relative to the central panel, or any other range. Additionally or alternatively, the one or more processors 210 may adjust the coverage area by forming a beam using the antenna elements on the given auxiliary panel to point at an angle. The angle of the tilt of the beam may be between 15 degrees and 35 degrees below the horizon, between 105 degrees and 125 degrees relative to the central panel, or any other range. The one or more processors 210 may determine at what angle to point the given auxiliary panel or the beam for a given sector based on population density, history of demand, presence of other terminals (terrestrial towers, other HAPs, etc.) providing coverage in or near the area, or other network factors.

In some implementations, the set of antenna elements on an auxiliary panel may also be steered to narrow or widen the area of coverage provided by that auxiliary panel. For instance, steering may be achieved by changing the digital beam forming coefficients. For example, when t 12 auxiliary panels are combined in a digital beam forming way, th12 may be the coefficient used in the digital domain. If 6 auxiliary panels are used instead of 12, the coefficients could simply be changed. This may widen the beam azimuthally. Another way to widen the beam is to change the number of antenna elements used in each panel. For example, if an auxiliary panel has 5 antenna elements, instead of using all 5 antenna elements, 4 or 3 could be used. To do so dynamically, a feed board with switches may be used, in order to enable different feed types (e.g. different antenna elements) to be switched on and/or off. The width of the area of coverage may also be determined based on population density, history of demand, presence of other terminals (terrestrial towers, other HAPs, etc.) providing coverage in or near the area, or other network factors.

Additionally or alternatively, the central panel of the antenna system 218 may be steerable. For example, the central panel may be mounted on a gimbal that is configured to adjust the orientation of the central panel relative to the HAP and thereby to adjust the pointing direction of the set of antenna elements central panel. In this regard, the one or more processors 210 may steer a pointing direction of a spot beam formed by the first set of antenna elements. In another example, the one or more processors 210 may electronically steer a pointing direction of the spot beam formed by the antenna elements on the central panel.

In addition or alternatively, the pointing direction of the spot beam may be computed outside of the HAP. For instance, the pointing direction may be computed by some remote computing device on the ground. In a gimbal-based steering system, information such as a current location of the HAP, the population (e.g. potential client devices and/or users of the network) on the ground, current locations of other HAPs (e.g. other HAPs in the network), the amount of power left in the HAP, as well as time of day (night time, day time etc), can be used to determine an optimal pointing direction for a gimbal-based antenna element. Once the optimal pointing direction is determined, a signal identifying this optimal pointing direction may sent to the HAP, and the one or more processors 210 may control the gimbal to achieve the optical pointing direction for the antenna element. Alternatively, if using digital beam forming (instead of gimbal-based) system, the optimal coefficient required to point the beam at the appropriate direction could be determined using the aforementioned information. Again, a signal identifying this information may sent to the HAP, and the one or more processors 210 may utilize the optimal coefficient to control the antenna element.

The one or more processors 210 may also narrow or widen the area of coverage provided by the central panel. The pointing direction and the width of the area of coverage provided by the central panel may be determined by the one or more processors 210 or some remote computing device on the ground based on population density, history of demand, presence of other terminals (terrestrial towers, other HAPs, etc.) providing coverage in or near the area, or other network factors.

In some antenna systems, the communication system may include a plurality of auxiliary panels without a central panel. For instance, a separate steerable antenna may be mounted on the HAP in place of the central panel. The separate steerable antenna may be configured to provide narrow, high capacity coverage to a smaller geographic area within the large geographic area. The smaller geographic area may be selected dynamically by the one or more processors 210 based on population density, history of demand, presence of other terminals (terrestrial towers, other HAPs, etc.) providing coverage in or near the area, or other network factors. Alternatively, a similarly configured, separate steerable antenna may be attached to the central panel to achieve the same or similar coverage.

The frequency utilized for the separate steerable antenna may from a higher frequency band than is utilized for the central and/or auxiliary panels. For example, the frequency range utilized for the central and/or auxiliary panels may include 700 MHz, and the frequency range utilized for the separate steerable antenna may include 2.6 GHz or 3.5 GHz.

The features described herein may provide for a communication system that, when mounted on a HAP, increases coverage and capacity for a network. The antenna system may reach areas tens of kilometers in radius with more consistent, low capacity coverage and may also be used for narrower, high capacity coverage for particular areas with a need for greater bandwidth. As described, the communication system may flexibly adapt to different network needs for a geographic area and may conserve resources as a result.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A system comprising an antenna system for a high-altitude platform (HAP), the antenna system including:
a central panel including a first set of antenna elements;
a plurality of auxiliary panels arranged about an axis perpendicular to and centered on the central panel and at an angular offset from the central panel, each auxiliary panel of the plurality of auxiliary panels including a second set of antenna elements; and
wherein the first set of antenna elements in the central panel is configured to provide network coverage within a first area having a first radius and each of the second sets of antenna elements in the plurality of auxiliary panels is configured to provide network coverage within a second area beyond the first radius.

2. The system of claim 1, wherein the plurality of auxiliary panels includes at least 4 auxiliary panels.

3. The system of claim 1, wherein the plurality of auxiliary panels includes at least 12 auxiliary panels.

4. The system of claim 1, wherein the central panel is arranged such that when in operation on the HAP, the central panel is oriented or faces in a downward direction relative to the HAP.

5. The system of claim 4, wherein the plurality of auxiliary panels is arranged such that when in operation on the HAP, the plurality of auxiliary panels is oriented at an angle offset from the downward direction relative to the HAP corresponding to a downward tilt.

6. The system of claim 5, wherein the downward tilt is a fixed orientation.

7. The system of claim 5, wherein the downward tilt is an adjustable orientation.

8. The system of claim 1, wherein the plurality of auxiliary panels is arranged such that when in operation on the HAP, the central panel is recessed relative to the auxiliary panels.

9. The system of claim 1, wherein the central panel includes a planar surface on which the first set of antenna elements are arranged.

10. The system of claim 9, wherein the central panel is a ring.

11. The system of claim 10, wherein the first set of antenna elements are arranged at regular intervals around the central panel.

12. The system of claim 1, wherein a coverage area of each of the plurality of auxiliary panels is adjustable independent from the central panel and other auxiliary panels in the plurality of auxiliary panels.

13. The system of claim 1, wherein each of the second sets of antenna elements are arranged in a linear array on a respective one of the plurality of auxiliary panels.

14. The system of claim 1, wherein the second set of antenna elements is a plurality of antenna elements arranged linearly along a given auxiliary panel of the plurality of auxiliary panels; and wherein each of the second sets of antenna elements has a clover-shape mounted parallel to the given auxiliary panel.

15. The system of claim 1, wherein each of the plurality of auxiliary panels has a same configuration.

16. The system of claim 1, further comprising one or more processors configured to electronically steer a pointing direction of a beam formed by the first set of antenna elements.

17. The system of claim 1, further comprising a gimbal configured to adjust an orientation of the central panel relative to the HAP and thereby steer a pointing direction of a beam formed by the first set of antenna elements.

18. The system of claim 1, wherein the plurality of auxiliary panels is arranged such that when in operation on the HAP, the central panel is arranged below the auxiliary panels.

19. The system of claim 1, further comprising the HAP.

20. The system of claim 19, wherein the HAP includes a balloon.

* * * * *